L. G. Kniffen,
Harvester Cutter.
No 2995
33999
Patented Dec. 24, 1861
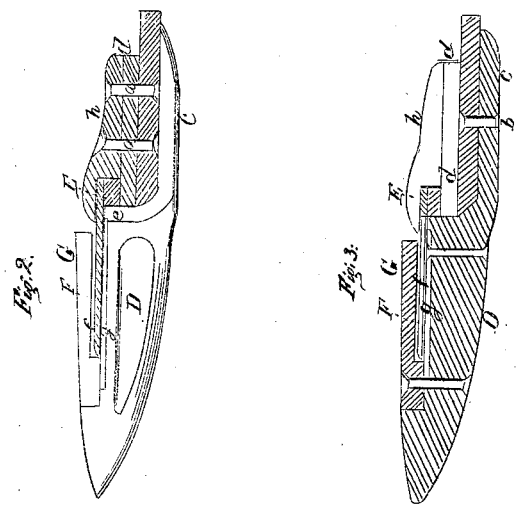
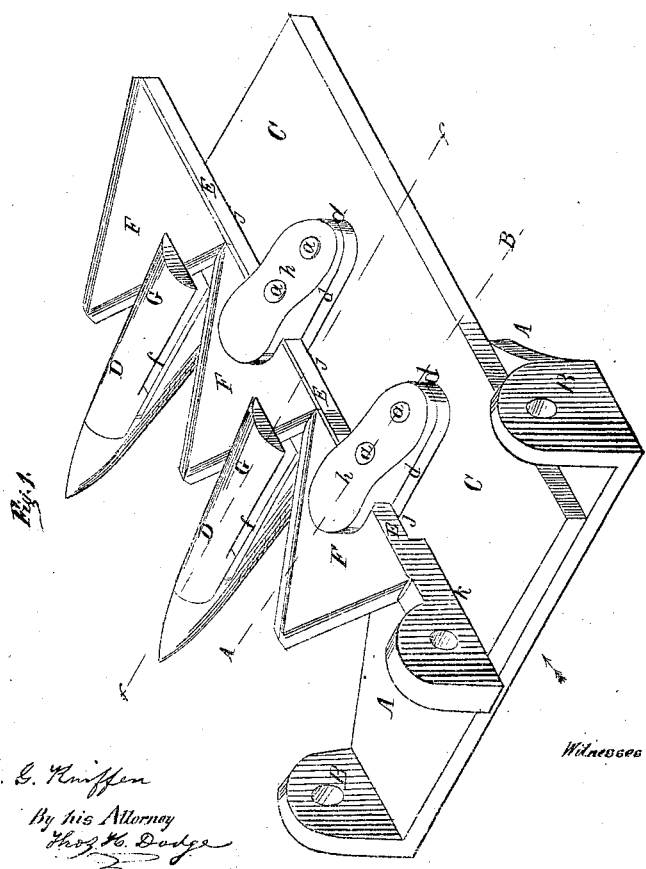
L. G. Kniffen
By his Attorney
Thos. H. Dodge
Witnesses
J. W. White
John P. Jacobs

UNITED STATES PATENT OFFICE.

L. G. KNIFFEN, OF WORCESTER, MASSACHUSETTS.

IMPROVEMENT IN CUTTING APPARATUS FOR HARVESTERS.

Specification forming part of Letters Patent No. 33,999, dated December 24, 1861.

*To all whom it may concern:*

Be it known that I, L. G. KNIFFEN, of Worcester, in the county of Worcester and State of Massachusetts, have invented certain new and useful Improvements in the Cutting Apparatus for Harvesters; and I do hereby declare the following to be a full, clear, and exact description thereof, reference being had to the annexed drawings, making a part of this specification, and in which—

Figure 1 is a perspective view of so much of a harvester or mowing and reaping machine as is necessary to illustrate my present invention. Fig. 2 is a sectional end view on line A B, looking in the direction of arrow 1, Fig. 1; and Fig. 3 is a similar view on line $x\ x$, same figure.

In the drawings, A represents a heel-piece having ears B B, by which to hinge the same to the coupling-piece, as fully indicated in my application for a patent of even date herewith for improvements in mowing-machines.

To the heel-piece A is fastened by bolts, rivets, or otherwise the heel of the finger-beam C, to the under side of which the rear ends, $c$, of the guards or fingers D are fastened by rivets $b$, as indicated in Fig. 3. After the guards are fastened to the finger-beam, narrow bearing-pieces $d$ are placed on the front of the finger-beam at suitable distances apart, their front ends striking against the elevations $e$ of the guard-fingers D. After these bearing-pieces are placed in position, the cutter-bar E, with its cutters F, fastened to its top side, is placed on the front ends of the bearing-pieces, thus bringing the cutters F in the slots $f$ of fingers D, when the constructer works the bar and cutters back and forth and observes whether the bearing-pieces allow the cutters to slide close in contact with the lower surface of the slots $f$, and which is formed in this instance by steel plates $g$, with sharp edges, fitted into a suitable recess formed in the finger when the same is cast, and where it is held by rivets or other means. If the bearing-pieces, or any of them, are too high, they can be easily and quickly filed off. After the operation of fitting the bearing-pieces so as to support the cutter-bar and cutters at the proper height has been accomplished, buttons $h$ are placed on and over bearing-pieces $d$ and cutter-bar and rear of the cutters, as indicated in the drawings, when they are riveted down to the finger-bar or beam C, and which in this instance is effected by two rivets, $a\ a$, passing through button, bearing-piece, and finger-beam. If preferred, the button can be riveted separately and only to the bearing-piece. It will be understood, of course, that the holes in the finger-beam are all properly bored in the first instance, so that, in fitting the bearing-pieces on, the rivets can be passed through them and the finger-beam very easily, and as quickly removed, if found necessary.

Any suitable number of fingers are to be used, and which will depend on the length of the finger-beam, the outer end of which is to be supported by a shoe in any of the well-known modes. Only two fingers and three cutters are shown in the drawings, as these serve to illustrate my invention.

It will be seen that the cutter-bar rests and reciprocates on the narrow bearing-pieces, while its rear bearing is against the buttons, which also project over the rear of the cutters, and thus hold the cutter-bar down. The elevations $e$ of the fingers or guards D form the front bearing to the cutter-bar. By this construction and arrangement I am able to use a very short guard, a narrow finger-beam, and yet have very little friction resulting from the action of the cutter-bar, while nearly all tendency of the cutter-bar to clog up is obviated, since there are open spaces $j$ under and in rear of the cutter-bar between the bearing-pieces $d$, so that all matter calculated to clog up the cutter-bar has free exit to the rear of the cutter-bar. By elevating the cutter-bar I am able to upset the heel thereof, as seen at $k$, Fig. 1, whereby the joint of the pitman therewith is brought down as low as if not lower than the cutters and in a horizontal plane with the joint of the heel-piece, with the coupling-piece attached to the main frame. This arrangement allows the cutter-bar to work over the finger-beam, and at the same time gives a good strong joint to operate the cutters by. It also enables the finger-beam and cutter-bar to fold up readily by reason of both joints being so nearly in the same horizontal plane, whereby when the cutter-bar is thrown out to its full extent the joint of the pitman and the heel-piece A can be made to range in the same line. Fig. 2 shows a side view of one of the guards, the top lip, G, of which in this instance is cast separately and then riveted on, as indicated in Fig. 3. By my invention great simplicity is combined with compactness and durability. None of the parts are liable to get out of order, and from practical tests it is found of great utility. All the parts are made of wrought and cast metal, suitable for the various purposes.

What I claim as my invention, and desire to secure by Letters Patent, is—

1. The combination of the elevations $e$ of the guards D, bearing-pieces $d$, and buttons $h$ with the finger-beam C and cutter-bar E, arranged and operating as and for the purposes set forth.

2. Elevating the cutter-bar E and supporting it above the finger-beam, in combination with the enlargement of the heel of the bar, as seen at $k$, Fig. 1, as and for the purposes set forth.

In witness whereof I have hereunto subscribed my name.

L. G. KNIFFEN.

Witnesses:
E. A. WOOD,
G. G. TAYLOR.